3,544,344
SET RETARDED PLASTER COMPOSITION
Richard J. Pratt, Floosmoor, and David W. Young, Homewood, Ill., assignors to Sinclair Research, Inc., New York, N.Y., a corporation of Delaware
No Drawing. Filed Apr. 18, 1968, Ser. No. 722,215
Int. Cl. C04b 11/14
U.S. Cl. 106—111     9 Claims

ABSTRACT OF THE DISCLOSURE

An improved plaster composition is prepared having significantly increased setting time and comprising a settable gypsum plaster and a minor amount, sufficient to retard setting of the plaster, of a water-soluble salt, such as the sodium salt, of the ester formed by reacting styrenemaleic anhydride copolymer with an alkoxy polyalkylene glycol. The styrene-maleic anhydride copolymer employed has a molecular weight of about 500 to 5000 and the preferred alkoxy polyalkylene glycol is methoxy polyethylene glycol having a molecular weight of about 300 to 5000.

---

This invention relates to a settable gypsum plaster composition which when mixed with a suitable amount of water has an increased set time. More particularly this invention is concerned with a plaster composition containing a minor amount, effective to retard setting of the plaster, of a water-soluble set retarder comprising a salt of the ester of styrene-maleic anhydride copolymer and an alkoxy polyalkylene glycol.

Settable gypsum plaster can be made by calcining gypsum ($CaSO_4 \cdot 2H_2O$) to remove most of the water of crystallization and form the hemihydrate. Calcined gypsum plaster (calcium sulfate hemihydrate) sets to form a coherent mass of interlocking crystals apparently by hydration of the hemihydrate to the dihydrate. The time which elapses between the initial mixing of the calcined gypsum and water and the stage when the crystals have formed and interlocked to the extent that the plaster is no longer workable is called the "setting time." Calcined gypsum plaster hardens or sets within about thirty minutes after mixing with water in suitable proportions. In order to prolong this "setting time" and therefore provide a greater opportunity to work with the plaster slurry or paste, it has become the practice to add setting retarders to the calcined gypsum.

Several types of compositions have been employed in the past to retard the setting of plaster. One such type of composition includes high molecular weight hydrolyzed products of proteinaceous animal or vegetable waste matter which act to delay the beginning of the setting process in plaster for a considerable length of time when present in relatively small amounts, say about 0.1 to 0.5 weight percent based on the weight of the calcinated gypsum. The composition of these proteinaceous retarding agents depends, however, on the source of the raw material and the hydrolyzing procedure with the result that the composition and therefore the retarding efficiency is not constant and may vary considerably. In addition, these natural protein retarders have strong, characteristic odors, lack storage stability and may contribute to the formation of foam during the plaster mixing process.

Alcohols have also been employed to retard the setting time of plaster. It is believed that these compounds decrease the rate of crystallization by decreasing either the rate of solution or the solubility of the hemihydrate. Alternatively, a similar effect is obtained when the solubility of the dihydrate is increased. Both of these effects require large amounts of the alcohol additives. Moreover, the additives, even when present in effective amounts, do not increase the setting time sufficiently to allow the plaster to remain workable long enough for most operations. In practice, therefore, alcohols are employed as set retarders in plaster only for special applications.

It is an object of this invention to provide a plaster composition containing a minor amount of stable, water-soluble set retarder which does not foam plaster slurries or pastes or impart odors and is not easily attacked by organisms. These and other objects are achieved in the present invention by providing a composition comprising a settable gypsum plaster and a minor amount, sufficient to retard the setting time of the plaster, of a water-soluble salt of the about 10 to 100 or more percent half-ester of a styrene maleic anhydride copolymer and an alkoxy polyalkylene glycol. Suitable amounts of the salt of the half-ester can be, for example, from about 0.05 to 5 weight percent or more, based on the weight of the plaster, preferably about 0.3 to 2 weight percent. The settable gypsum is usually the major amount of the composition on a dry basis.

The styrene-maleic anhydride copolyer contains a molar ratio of polymerized styrene to polymerized maleic anhydride units of about 1:1 to 4:1, preferably about 1:1, and has an average molecular weight, prior to esterification of about 500 to 5000, preferably about 1500–3000. The copolymer is reacted with a suitable alkoxy polyalkylene glycol to form the about 10 to 100 or more percent half-ester. Preferably the ester is an at least about 60 percent half-ester; however, lower percent half-esters also are effective when higher molecular weight polyglycols (e.g., above about 700) are employed to esterify the styrene-maleic anhydride copolymer.

Suitable esterifying polyglycols are those coresponding to the general formula:

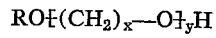

wherein $x$ is 2 to 5, preferably 2 to 3; $y$ is 2 to 150, preferably about 5 to 30, and R is a monovalent alkyl radical of 1 to about 3, preferably 1 or 2 carbon atoms. As preferred glycols, having the above structure, may be mentioned methoxy polyethylene glycols having molecular weights of at least about 300 up to 5000, preferably about 350 to 5000, and most preferably about 700 to 1000.

The styrene-maleic anhydride half-esters of this invention are soluble in water at pH of about 4 or higher. Neutralization of the ester to a sufficiently alkaline pH can be accomplished using, for example, alkali metal hydroxides, ammonia, amines or basic aminoalcohols, although sodium hydroxide is preferred. The various water-soluble, salt-forming basic hydrocarbon amines can be employed in the present invention to form basic amine salts of the styrene-maleic anhydride half-ester. Preferred amines are tertiary amines such as, for example, trifurfurylamines. Alcohol amines, such as for example, triethanolamines may also be employed as well as glycol amines of molecular weight up to about 1500 or capped glycol amines of molecular weights up to about 5000.

Preparation of the esterified styrene-maleic anhydride polymer of the present invention may be by known methods; for example, styrene and maleic anhydride can be first polymerized, for instance, by solution polymerization where the monomers are polymerized in a suitable solvent employing as a polymerization catalyst a free-radical catalyst, such as a peroxide, preferably benzoyl peroxide, dicumyl peroxide or an alkyl peroxy dicarbonate, at a temperature of about 75 to 300° C. or more. Suitable solvents include the aromatic hydrocarbon solvents, such as cumene, p-cymene, xylene, toluene, etc. Other suitable solvents are the ketones, such as methylethylketone. A preferred manner of carrying out the polymerization is by what is known as incremental feed addition. By this method the monomers and catalyst are first dissolved in a portion of the solvent in which the polymerization is to be conducted and the resulting solution fed in increments into a reactor containing solvent heated to reaction temperature, usually the reflux temperature of the mixture.

When an aromatic solvent is employed as the solvent for the polymerization, the formation of the copolymer causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the product necessitates a solvent-stripping operation. Esterification of the styrene-maleic anhydride polymer with the alkoxy polyalkylene glycol can be carried out in any desired manner and may advantageously be conducted in the presence of esterification catalysts known in the art.

The preparation of the styrene-maleic anhydride-alkoxy polyalkylene glycol ester is illustrated in Example I.

EXAMPLE I

Ester preparation

A mixture of 350 grams (1.0 equivalent) of methoxy polyethylene glycol having a molecular weight of 350 (Y=7) and 225 grams (1.0 anhydride equivalent) of styrene-maleic anhydride copolymer (1:1 monomer ratio) having a molecular weight of about 1800 was heated at 185–195° C. for 2.5 hours under a nitrogen atmosphere. The product was analyzed by alkali titration as a 70% half-ester. (Table I) That is, 35% of all carboxyls were converted to ester.

Example II illustrates the preparation of the alkali metal salt of the styrene-maleic anhydride-alkoxy polyalkylene glycol ester of this invention.

EXAMPLE II

Preparation of a solution of sodium salt of 70% half-ester

A mixture of 12.0 grams of the ester of Example I was stirred with 88.0 grams of water at 160° F. (steam bath) until the ester was dispersed. Sodium hydroxide as a 10% solution was added dropwise until the pH stabilized at 7.0. About 0.7 to 1.0 gram of alkali was required. Solid alkali may also be used. This solution was approximately 12% solids.

The plaster composition of this invention can be prepared conveniently by adding the neutralised ester salt either in dry form or as a solution or paste to the gypsum plaster prior to, with or after the addition of sufficient water to cause the plaster to set. Thus the ester salt can be removed from the water and the dried ester salt mixed with the dry gypsum plaster to form plaster compositions of this invention having increased setting time when subsequently mixed with water. This does not, however, exclude other procedures which may be employed advantageously. For example, the ester salt may be added to the water which is to be mixed with the plaster.

EXAMPLE III

Twenty-five grams of water were mixed with 0.75 gram of the sodium salt solution of Example II. The resulting solution was added to 45 grams of molding gypsum plaster having a setting time of 10 minutes. The resulting slurry was stirred for five minutes and then poured into an aluminum weighing dish. The setting time was the time interval between mixing the ingredients and the hardening of the slurry. Table I summarizes the results obtained and compares them with results obtained by varying the proportions and the composition of the set retarding additive.

TABLE I

| (Methoxy polyethylene glycol) mol. wt. ethylene oxide units (Y) | Styrene-maleic anhydride glycol, half-ester level | Concentration of retarder (as sodium salt), percent | Setting time (minutes) |
|---|---|---|---|
| (1) 350, Y=7 | 70 | 0.4 | 300 |
| (2) 350, Y=7 | 60 | 0.4 | 480 |
| (3) 350, Y=7 | 60 | 0.2 | 55 |
| (4) 350, Y=7 | 60 | 0.1 | 20 |
| (5) 750, Y=16–17 | 32 | 0.2 | 240 |
| (6) 750, Y=16–17 | 32 | 0.05 | 25 |
| (7) 5000, Y=113 | 6 | 0.2 | 20 |
| (8) 350, Y=7 | 0 | 0.4 | 10 |
| (9) None | 0 | 0 | 10 |
| (10) Ethylene glycol capped with n-butyl group | 100 | 0.2 | 10 |
| (11) 167, Y=3 | 70 | 0.2 | 15 |
| (12) 350, Y=7 | 50 | 0.2 | 10 |

As may be seen in Table I, the longest setting times (Compositions 1 and 2) were achieved using 0.4 weight percent of the sodium salt of the 60 and 70 percent half-esters of methoxy polyethylene glycol having 7 ethylene oxide units and molecular weight of 350. Good results were also obtained in Composition 5 using only a 32 percent half-ester but of a methoxy polyethylene glycol having 16 to 17 ethylene oxide units and a molecular weight of 750. The use of the glycol alone (Composition 8) of 0.2% of the 50 percent half-ester of a methoxy polyethylene glycol having 7 ethylene oxide units and a molecular weight of 350 (Composition 12) produced no change in setting time.

It is claimed:

1. A plaster composition having increased setting time when mixed with water comprising gypsum plaster and, a minor amount sufficient to retard the setting of the plaster, of a water-soluble salt of an at least about 10 percent half-ester of a styrene-maleic anhydride copolymer having an average molecular weight of about 500 to 5000 and a mole ratio of styrene to maleic anhydride of about 1:1 to 4:1, and an alkoxy polyalkylene glycol having a molecular weight of about 300 to 5000 and corresponding to the general formula:

$$RO[(CH_2)_x—O]_yH$$

wherein $x$ is 2 to 5, $y$ is 2 to 150 and R is an alkyl radical of 1 to about 3 carbon atoms.

2. The composition of claim 1 wherein the alkoxy polyalkylene glycol is a methoxy polyethylene glycol.

3. The composition of claim 2 wherein the styrene-maleic anhydride copolymer has a molecular weight of about 1500 to 3000.

4. The composition of claim 1 which contains about 0.05 to 5 weight percent, based on the weight of the plaster, of said half-ester salt.

5. The composition of claim 1 wherein the half-ester is an at least about 60 percent half-ester.

6. The composition of claim 5 wherein the alkoxy polyalkylene glycol is a methoxy polyethylene glycol of molecular weight about 350 to 1000.

7. The composition of claim 6 wherein the water-soluble salt is the sodium salt.

8. The composition of claim 1 wherein the water-soluble salt is the sodium salt.

9. The composition of claim 8 wherein the styrene-maleic anhydride copolymer has a molecular weight of about 1500 to 3000.

References Cited

UNITED STATES PATENTS

| 2,451,445 | 10/1948 | Parsons | 106—111 |
| 3,317,327 | 5/1967 | Matsuda et al. | 106—315 |

JAMES E. POER, Primary Examiner

U.S. Cl. X.R.

106—315